(12) United States Patent
Kulkarni

(10) Patent No.: US 6,870,636 B2
(45) Date of Patent: *Mar. 22, 2005

(54) DETERMINING COLOR MAPPINGS FOR A COLOR PRINTER

(75) Inventor: Manish Kulkarni, Sunnyvale, CA (US)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,689

(22) Filed: Nov. 20, 1998

(65) Prior Publication Data

US 2003/0147088 A1 Aug. 7, 2003

(51) Int. Cl.$^7$ ................................................ G06K 1/00
(52) U.S. Cl. ........................ 358/1.9; 358/504; 358/518; 382/167
(58) Field of Search ...................... 358/1.9, 504, 518, 358/520, 505, 515, 523, 524, 525; 382/162, 167; 345/589, 591, 600, 601, 602, 603

(56) References Cited

U.S. PATENT DOCUMENTS

| | | | | |
|---|---|---|---|---|
| 4,959,711 A | | 9/1990 | Hung et al. .................... 358/80 |
| 5,502,580 A | | 3/1996 | Yoda et al. ................... 358/518 |
| 5,553,199 A | * | 9/1996 | Spaulding et al. ............ 358/1.9 |
| 5,606,432 A | | 2/1997 | Ohtsuka et al. .............. 358/527 |
| 5,621,545 A | | 4/1997 | Motta et al. ................. 358/518 |
| 5,625,378 A | * | 4/1997 | Wan et al. .................... 345/600 |
| 5,649,072 A | | 7/1997 | Balasubramanian ........ 395/109 |
| 5,721,572 A | * | 2/1998 | Wan et al. .................... 345/590 |
| 5,748,858 A | | 5/1998 | Ohtsuka et al. .............. 395/109 |
| 5,786,908 A | * | 7/1998 | Liang .......................... 358/518 |
| 6,151,135 A | * | 11/2000 | Tanaka et al. ................ 358/1.9 |
| 6,204,939 B1 | * | 3/2001 | Lin et al. ..................... 358/518 |
| 6,707,573 B1 | * | 3/2004 | Ito et al. ...................... 358/1.9 |

OTHER PUBLICATIONS

Betz, Mark, "VGA Palette Mapping Using BSP Trees: A multidimensional cousin of the binary tree", *Dr. Dobb's Journal*, vol. 18, No. 7, p. 28, Jul. 1993.
"Local Minimization and Steepest Descent", <http://www-.stanford.edu/class/cs205/notes/book/node25.html>, (visited Nov. 20, 1998).
"Newton's Method", <http://www.stanford.edu/class/cs205/notes/book/node26.html>, (visited Nov. 20, 1998).
"Simulated Annealing", <http//petaxp.rug.ac.be/~erik/research/research–part2.html>, (visited Nov. 20, 1998).
"Simulated Annealing Using Cauchy Cooling", <ftp://ftp.taygeta.com/pub/Forth/Unreviewed/simannl.seq>, (visited Nov. 20, 1998).

* cited by examiner

*Primary Examiner*—Joseph R. Pokrzywa
(74) *Attorney, Agent, or Firm*—Fitzpatrick, Cella, Harper & Scinto

(57) ABSTRACT

A method for deriving a reverse model look-up table whose entries represent device dependent colors as a function of device independent colors, based on a forward model look-up table whose entries represent device independent colors obtained in response to printout of corresponding device dependent colors. For each device independent target color, a binary search of the forward model look-up table is performed so as to locate a cell that contains the device independent target color. The grid points from the forward model look-up table that define the cell are interpolated so as to obtain device dependent colors corresponding to the device independent target color. The device dependent color is stored at the grid point for the reverse model look-up table at a position corresponding to the device independent target color.

26 Claims, 6 Drawing Sheets

DETERMINING COLOR MAPPINGS FOR A COLOR PRINTER

BACKGROUND OF THE INVENTION

1. Field of the Invention

The present invention relates to color printing, and in particular relates to a fast, iterative method for deriving a look-up table that represents the color mapping for a printer from device independent colors (such as a color in CIEXYZ or CIELAB color space) to a color in a device dependent color space (such as a color in CMY or CMYK color space).

2. Background of the Invention

In conventional computer systems that print color images on a color printer, the precise colors actually printed by the printer are calculated by the computer using a look-up table. Specifically, the look-up table is arranged as a three-dimensional grid of cells, with each entry in the grid representing printer colorant values (such as cyan, magenta, yellow and black colorant values) as a function of some desired color in a different (usually device independent) color space. Based on a desired color, the computer accesses the look-up table to determine the printer colorant values. For colors not stored exactly in the grid, interpolation is conventionally employed so as to determine the colorant values.

Recently, there has been increased interest in producing printed color images with superior color fidelity, such that the printed image matches a displayed image or a scanned-in image. To accomplish color matching, it has become customary to employ a two-step procedure. In the first step, the scanned-in or displayed image, which typically is stored in device dependent color space such as RGB color space, is transformed into a device independent color space such as CIEXYZ or CIELAB color space. This first transformation allows for compensation and calibration of device dependent characteristics, such as phosphor spectral characteristics or spectral sensitivity characteristics of a scanner. In the second step, the device independent colors are transformed into printer device dependent colors, such as CMY or CMYK colors. This second transformation allows for compensation of printer characteristics.

One difficulty with this approach is the determination of entries for the look-up table that gives the transformation from device independent colors to device dependent colors for the printer. In the past, this look-up table was derived once at the factory, based on empirical measurements of a wide variety of color patches printed at fixed colors in the device dependent color space. A single derivation of a look-up table, however, does not allow for post-factory compensation based on effects such as printer aging, selection of different inks with different spectral characteristics, selection of different print media, and other effects which change printout characteristics. Although it is possible to recalibrate the printer by printout of new color patches and by empirical measurement of the resulting device independent colors, it is still difficult, tedious and time consuming to derive a new printer look-up table, even though such derivation is ordinarily performed by a computer.

SUMMARY OF THE INVENTION

It is an object of the invention to provide a fast iterative method for deriving a printer look-up table, with entries in the look-up table corresponding to device dependent colors as a function of device independent colors.

The look-up table is derived from empirical measurements in device independent coordinates of predetermined device dependent color patches. The empirical measurements are preferably stored in a look-up table, with the look-up table commonly being referred to in the art as the "forward model". Accordingly, the look-up table that is derived by the present invention from the forward model look-up table will hereinafter be referred to as the "reverse model" look-up table.

According to one aspect of the invention, to derive an entry in the reverse model look-up table based on a target color in device independent coordinates, a binary search of the forward model look-up table is performed so as to locate a cell that contains the device independent target color. The grid points that define the cell in the forward model look-up table are then identified, and entries from the grid points in the forward model look-up table are interpolated so as to obtain a device dependent color corresponding to the device independent target color. The device dependent color is thereafter stored at the grid point for the device independent target color of the reverse model look-up table.

Preferably, interpolation according to the invention is tetrahedral so as to minimize color discontinuities and color gradient effects between adjacent cells of the forward model look-up table.

It is also preferable to perform the binary search of the forward model look-up table with iterated steps that start from a starting color in device dependent color space. The iterated steps preferably include a division of the device independent color space into multiple regions defined by device independent colors corresponding to small variations from the starting color in device dependent color space, a determination of which of the multiple regions contains the device independent target color, and an update of the starting color based on which region contains the device independent target color. In particular, to determine which of the multiple regions contains the device independent target color, it is preferred to obtain dot products for each normal plane vector that defines the multiple regions with the vector that defines the difference between the target color and the device independent color corresponding to the starting color, and thereafter to determine the region in accordance with which of the dot products yields positive values and which yields negative values.

Because the invention performs a binary search only for the purpose of locating the cell that contains the device independent target color, the binary search is quick and can be performed with relative ease. For example, in a situation where the forward model look-up table is a 9×9×9 uniform grid in CMY device dependent colors, the binary search can locate the cell for a device independent target color within about three and at most four iterations of the binary search. Moreover, since interpolation is performed using the grid points for the cell so located, high color fidelity for the reverse model look-up table is obtained with good continuity and color gradient smoothness.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
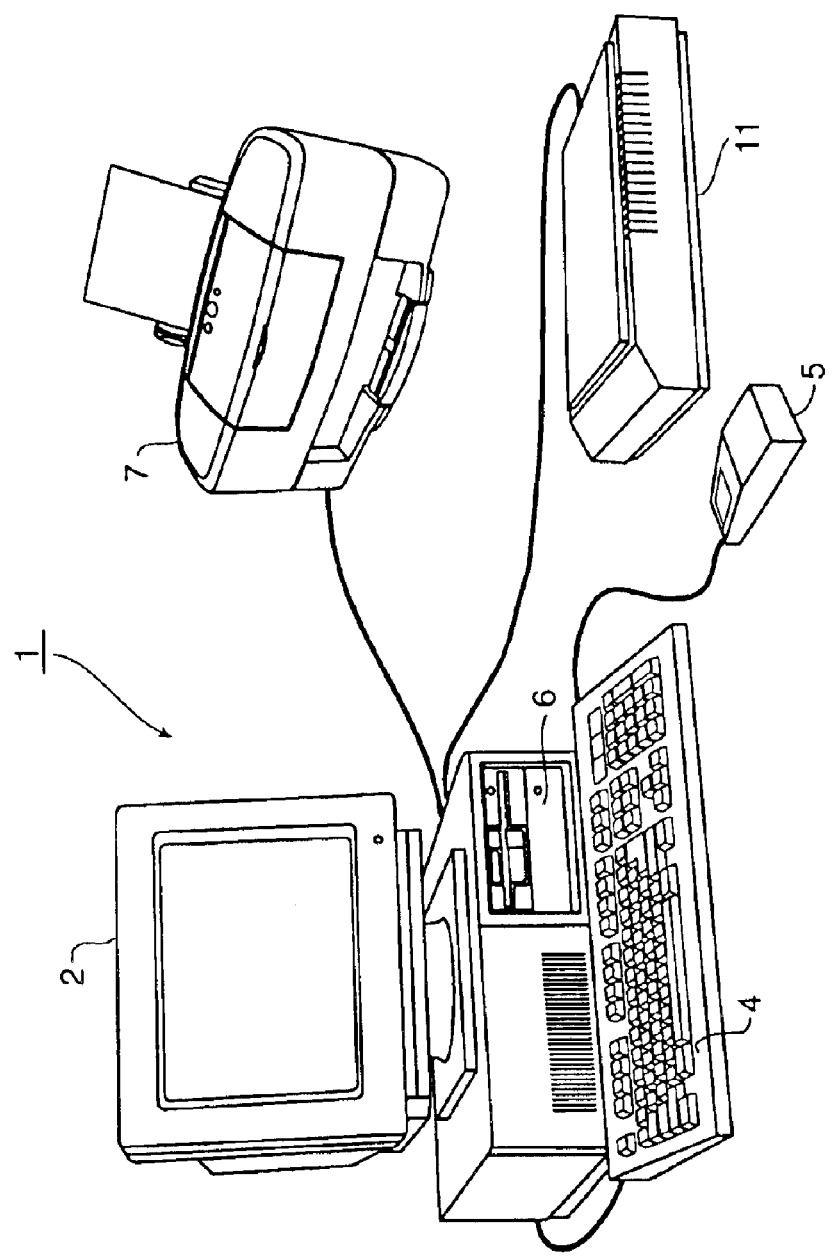
FIG. 1 is a representational view of a computer system in which the present invention may be utilized.

FIG. 1 is a representational view of a computer system in which the present invention may be utilized. Computer system 1 may be a Macintosh, PC-compatible, or other type of computer having an operating system such as Microsoft® Windows®. Provided with computer system 1 are display 2 which may be a color monitor, keyboard 4 for entering user commands, and pointing device 5, such as a mouse, for pointing to and for manipulating graphical user interfaces and other objects displayed on display 2.

Computer system 1 also includes a mass storage device such as fixed disk 6 for storing computer-executable process steps for image processing applications, process steps for generating a forward model look-up table, process steps for determining a reverse model look-up table according to the invention, and other application programs and data. Such storage may also be provided by other storage media such as CD-ROM (not shown).

Printer 7 is provided for outputting images such as images from image processing applications, scanned-in images and the like. Printer 7 preferably is a color printer which prints images using a combination of differently-colored inks, such as cyan, magenta and yellow inks. Printer 7 optionally uses black ink in addition to these differently-colored inks.

Scanner 11 is an image acquisition device that preferably also is included with computer system 1. Scanner 11 may be used to scan documents for output by printer 7 or to scan documents for processing by image processing applications executing within computer system 1. Of course, images may be input into computer system 1 using other image acquisition devices, such as a film adapter unit for scanner 11, a digital camera or the like. Images also may be input into computer system 1 from a variety of other sources, such as from a network through an unshown network interface.

It should be understood that although a programmable general-purpose computer is shown in FIG. 1, a dedicated computer terminal or other type of data processing equipment can embody the present invention.

Figure 2:
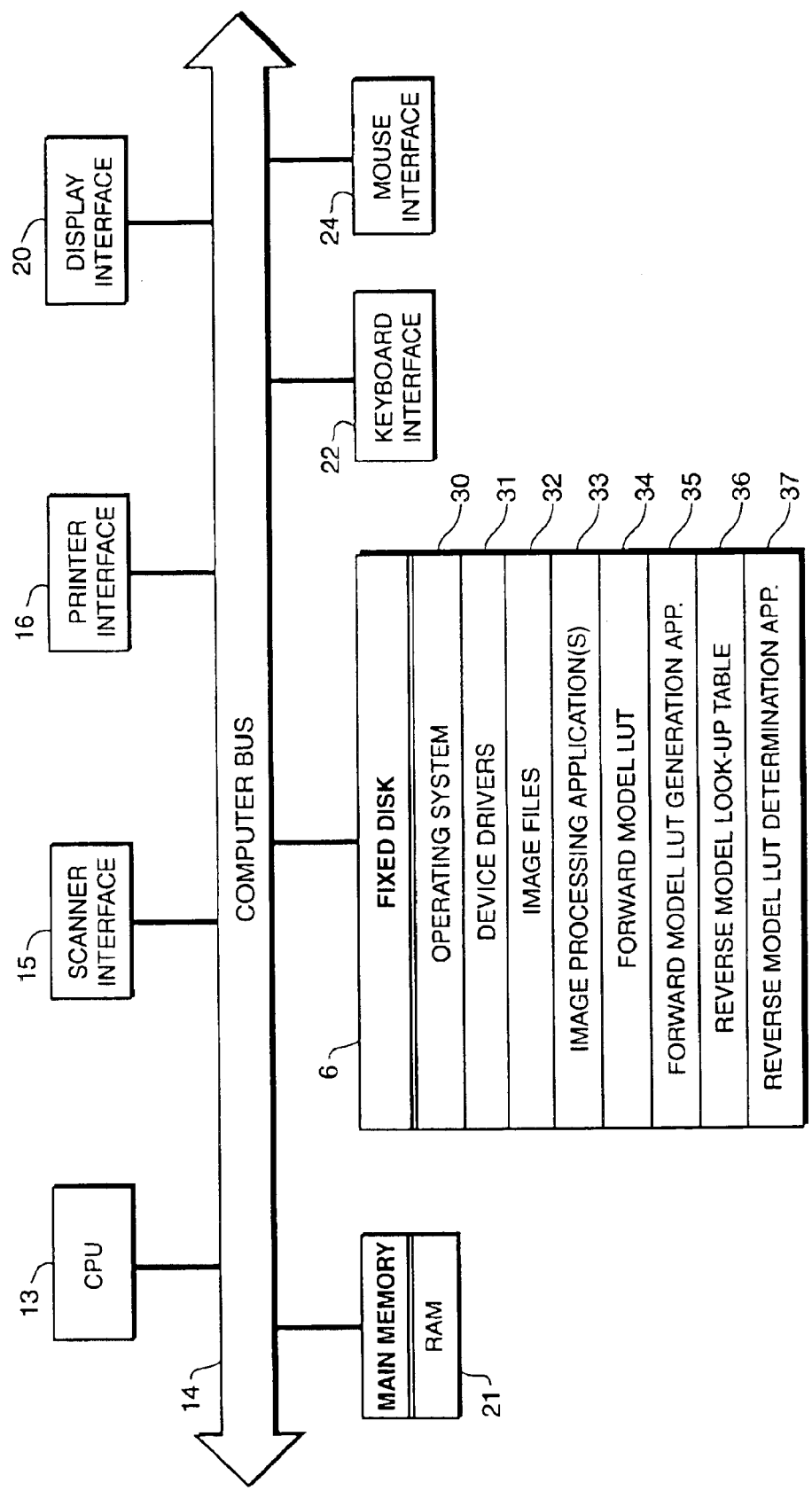
FIG. 2 is a detailed block diagram showing the internal architecture of the computer system shown in FIG. 1.

FIG. 2 is a detailed block diagram showing the internal architecture of computer system 1. As shown in FIG. 2, computer system 1 includes central processing unit (CPU) 13, which interfaces with computer bus 14. Also interfacing with computer bus 14 are scanner interface 15, printer interface 16, display interface 20, main random access memory (RAM) 21, fixed disk 6, keyboard interface 22, and mouse interface 24.

Main memory 21 interfaces with computer bus 14 so as to provide RAM storage to CPU 13 during execution of software applications. More specifically, CPU 13 loads process steps from a storage medium such as fixed disk 6 into main memory 21. CPU 13 then executes the stored process steps from main memory 21 in order to execute the applications. Data such as image files 32, forward model look-up table 34, reverse model look-up table 36, and the like can be stored in main memory 21, where the data can be accessed by CPU 13 during execution of the process steps.

As also shown in FIG. 2, fixed disk 6 typically contains operating system 30, device drivers 31, image files 32, and image processing applications 33. Also stored on fixed disk 6 are process steps for an application 35 to generate a forward model look-up table, and process steps for an application 37 to determine a reverse model look-up table. It should be noted that device drivers 31 can form part of operating system 30, and that forward model look-up table 34 and reverse model look-up table 36 can be embedded in a printer driver included in device drivers 31. Forward model look-up table generation application 35 and reverse model look-up table determination application 37 can be combined into a single application program. The look-up tables and the look-up table application programs are explained in more detail below.

Images provided to computer system 1 by scanner 11 through scanner interface 15 can be manipulated with image processing applications 33 running on computer system 1. The images then can be output to printer 7 from the image processing applications through a printer driver. Alternatively, the images can be output from scanner 11 to printer 7 through a printer driver, without being processed by image processing applications 33.

Images output by image processing applications 33 and scanner 11 typically are defined in a color space corresponding to display 2 or scanner 11, for example RGB color space. However, printer 7 typically generates printed output based on images defined in terms of the differently-colored inks used by printer 7. Thus, the images output to printer 7 should be defined in a device dependent color space corresponding to printer 7, for example CMY color space or CMYK color space. Thus, the printer driver must transform images from image processing applications 33 or scanner 11 from a device dependent color space for a display or a scanner to a device dependent color space for a printer.

Figure 3:
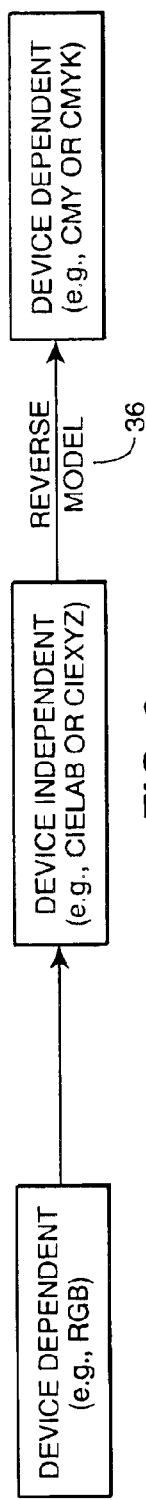
FIG. 3 is a representational view of color transformations that can occur when printing images using the computer system shown in FIG. 1.

FIG. 3 is a representational view for illustrating such a transformation. Typically, an image in device dependent color space 40 corresponding to a display or a scanner is first transformed into device independent color space 41 such as CIELAB or CIEXYZ color space. This first transformation allows for compensation and calibration of device dependent characteristics, such as phosphor spectral characteristics of a display or spectral sensitivity characteristics of a scanner. The image in device independent color space 41 is then transformed into device dependent color space 42 corresponding to printer 7, such as CMY or CMYK color space. This second transformation allows for compensation of printer characteristics.

The foregoing transformations preferably are implemented using look-up tables. Conventionally, these look-up tables are derived once at the factory, based on empirical measurements of input colors. For example, the reverse model look-up table for transforming an image in device independent color space to device dependent color space can be derived from empirical measurements of a wide variety of color patches printed at fixed colorant values in the device dependent color space (i.e., the forward model). A one-time derivation of the reverse model look-up table, however, does not allow for compensation based on effects such as printer aging, selection of different inks with different spectral characteristics, selection of different print media, and other effects which change printout characteristics. The present invention addresses this need by providing a system for rapid re-derivation of the reverse model look-up table that transforms from a device independent color space to a device dependent color space based on empirical measurements in a device independent color space of predetermined device dependent color patches.

According to the present invention, the forward model look-up table is preferably formed by forward model look-up generator 35, which prints a wide variety of color patches using printer 7, and then scans and converts the resulting color patch values. Preferably, all possible combination of 9 equally-spaced values for each of cyan, magenta and yellow are printed, yielding 9×9×9=729 color patches. It is also possible to include 9 equally-spaced values for black, which would yield 9×9×9×9=6561 color patches. The color patches are then scanned by scanner 11, yielding a color patch value for each color patch. Usually, the color patch values will be scanned in the scanner's device dependent color space, such as RGB. Accordingly, forward model look-up generator 35 converts these device dependent color values from scanner space to a device independent space (such as CIELAB or CIEXYZ) using known scanning characteristics of scanner 11. Then, forward model look-up table generation application 35 builds the forward model look-up table, by inserting at each device dependent (CMY or CMYK) grid point the corresponding color value (in device independent space) of the color patch actually printed for the grid point. The present invention uses this forward model look-up table to derive a reverse model look-up table such as reverse model look-up table 36. This derivation is preferably performed by reverse model look-up table determination application 37, although the derivation can be performed by a printer driver or some other application program.

Figure 4:
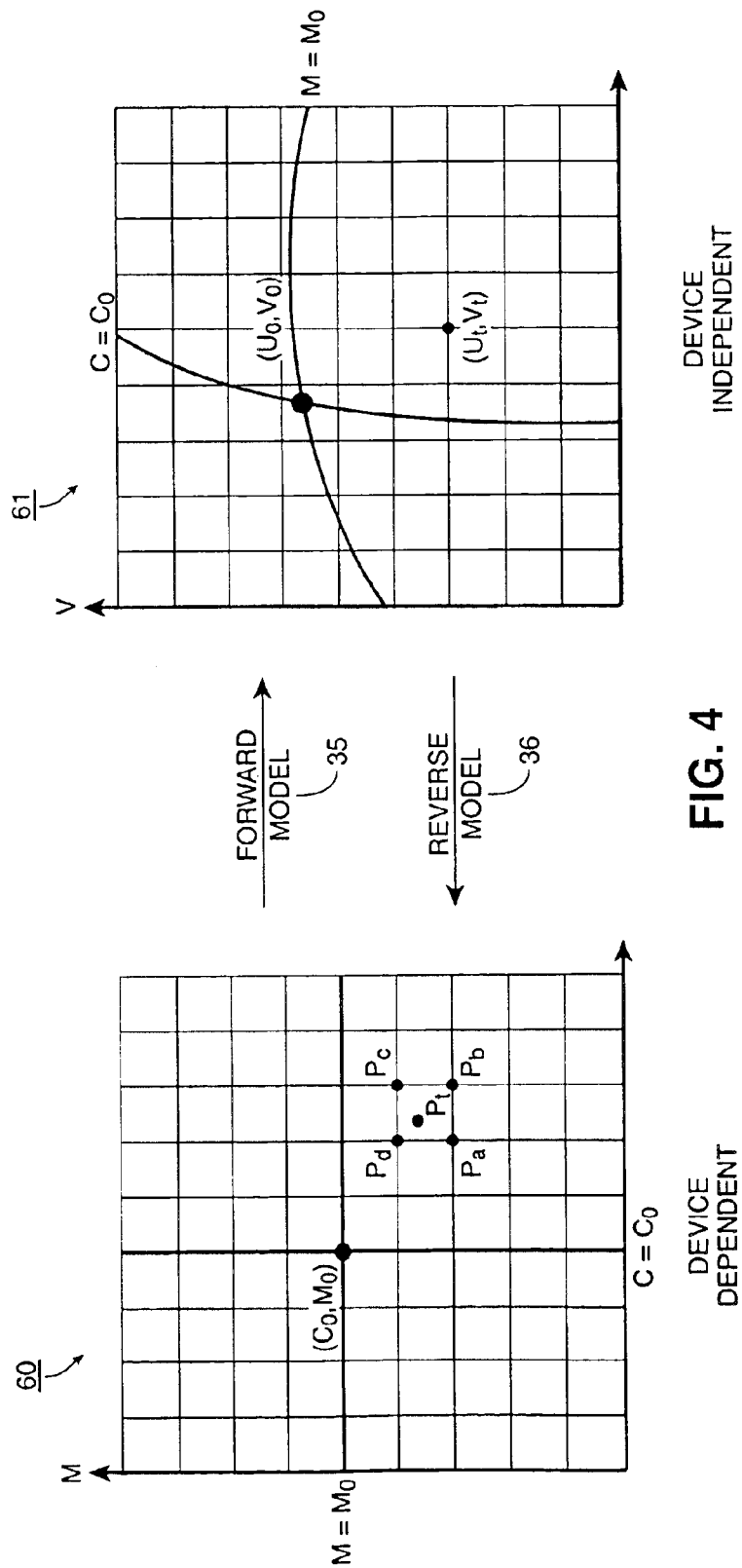
FIG. 4 is a representational view for explaining derivation of a reverse model look-up table from a forward model look-up table according to the invention.
Figure 5:
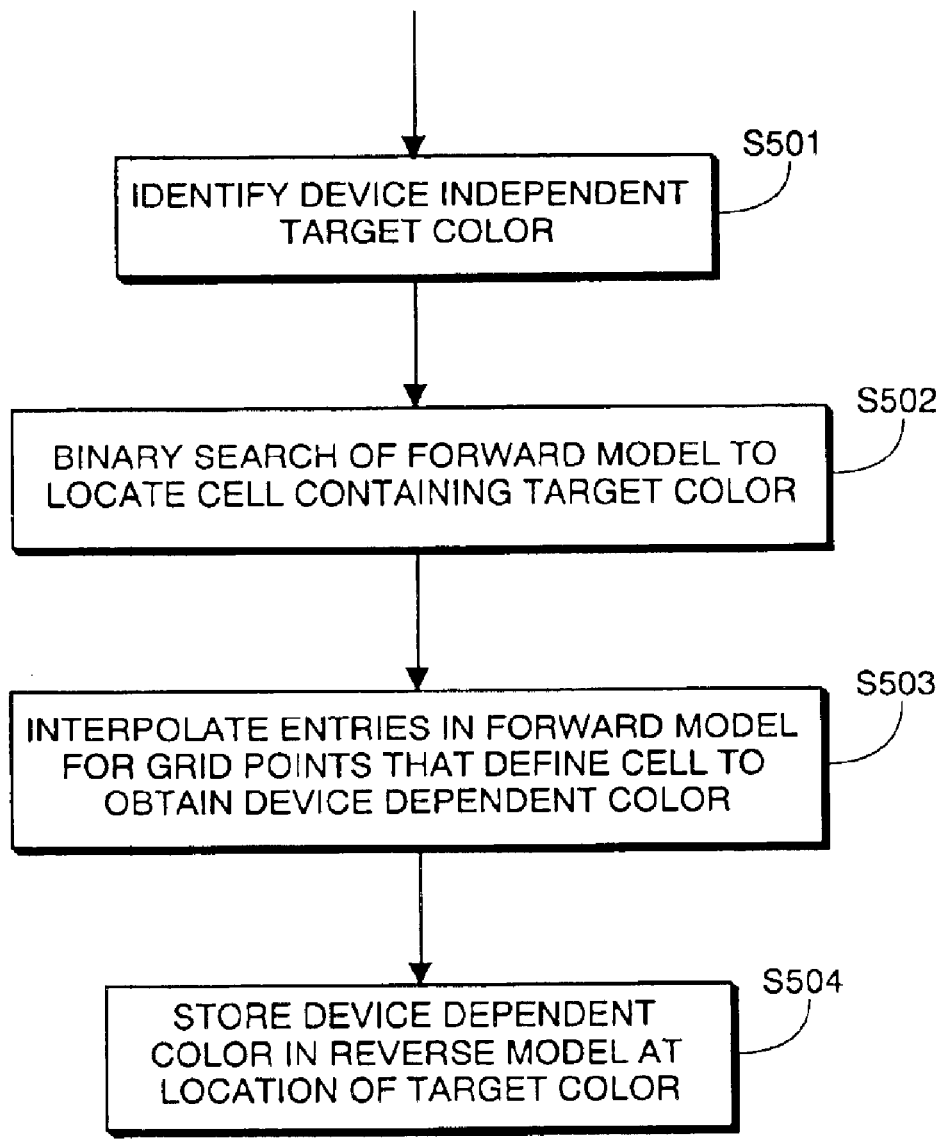
FIG. 5 is a flowchart for explaining derivation of a reverse model look-up table from a forward model look-up table according to the invention.

FIG. 4 is a representational view for explaining derivation according to the invention of a reverse model look-up table from a forward model look-up table, and FIG. 5 is a flow diagram showing stored process steps by which the reverse model is derived from the forward model. Briefly, according to the invention, a reverse model look-up table is derived based on a forward model look-up table. The entries in the reverse model look-up table represent device dependent colors as a function of device independent colors. The entries in the forward model look-up table represent device independent colors as a function of printout of corresponding device dependent color components. Both the forward model look-up table and the reverse model look-up table comprise a grid of cells in their respective color spaces with entries at each grid point of the grid. The derivation method according to the invention comprises the following steps to determine an entry in the reverse model look-up table for a device independent target color. First, a binary search of the forward model look-up table is performed to locate a cell that contains the device independent target color. Second, entries from the forward model look-up table at grid points that define the cell are interpolated so as to obtain a device dependent color corresponding to the device independent target color. Third, the device dependent color is stored at the grid point of the reverse model look-up table for the device independent target color.

In order to simplify the following explanation of the derivation method according to the invention, the method is initially explained with respect to two-dimensional color spaces. In other words, the derivation method is initially explained for colors that are each defined with two color values. Thereafter, expansion of the method according to the invention to higher-order color spaces (e.g., three-dimensional color spaces) is explained.

In FIG. 4, device dependent color space 60 is depicted with axes for two device dependent color values, namely C and M. Likewise, device independent color space 61 is depicted with axes for two device independent color values, namely U and V. Forward model look-up table 35 maps each grid point (represented by intersections of dotted lines) in device dependent color space 60 to a value in device independent color space 61. Likewise, reverse model look-up table 36 maps each grid point in device independent color space 61 to a value in device dependent color space 60. Each cell in one of the look-up tables is defined by the corner grid points for that cell.

In both of these models, a color defined by a grid point in one of the color spaces does not necessarily map to a color defined by a grid point in the other color space. Likewise, lines representing constant color value in one color space typically map to curves in the other color space. For example, as shown in FIG. 4, the lines representing constant color values of $C+C_0$ and $M+M_0$ in device dependent color space 60 are mapped by the forward model into curves in device independent color space 61. As also shown in FIG. 4, the color represented by the grid point $(C_0, M_0)$ in device dependent color space 60 does not map to a grid point at $(U_0, V_0)$ in device independent color space 61.

According to the invention, forward model look-up table 35 is a look-up table obtained through empirical measurements. Thus, for any given grid point in device dependent color space 60, forward model look-up table 35 contains a color defined by a U color value and a V color value. However, what is needed for generating a printout is reverse model look-up table 36 which maps grid points in device independent color space 61 to colors defined in device dependent color space 60.

In order to derive reverse model look-up table 36, device dependent color values must be entered for each grid point in device independent color space 61. The derivation of these grid point values according to the invention, for a target color defined by a grid point $(U_t, V_t)$ in device independent color space 61, is now explained.

FIG. 5 is a flowchart for explaining this derivation of device dependent color values. First, in step S501, a target color in device independent color space 61 is identified, for example $(U_t, V_t)$. The target color lies exactly on a grid point in device independent color space 61. Then, in step S502, a binary search of forward model look-up table 35 is performed so as to locate a cell that contains the device independent target color. As discussed above, each cell in forward model look-up table 35 corresponds to one of the grid cells in device dependent color space 60. Thus, for example, if the binary search indicates that the device dependent color corresponding to the target device independent color is $P_t$, then the cell located by the binary search is defined by the grid points $P_a$, $P_b$, $P_c$ and $P_d$ in device dependent color space 60. Note that it is not necessary to identify the exact position of point $P_t$; rather, all that is ordinarily needed is the identity of the cell in which it lies, together with the grid points that define the cell. The preferred embodiment of the binary search so as to identify the cell is explained in more detail below with reference to FIGS. 6A, 6B and 7.

Once the cell that contains the target color has been located, flow proceeds to step S503. In step S503, the device dependent color values for the grid points are interpolated so as to obtain a device dependent color (i.e., C and M color values) corresponding to the device independent target color (i.e., target U and V color values). After interpolation, the device dependent color values are stored in the reverse model (step S504). The device dependent color values are stored at the grid point of reverse model look-up table 36 that corresponds to the device independent target color $(U_t, V_t)$.

The foregoing operation is repeated for each of the grid points in device independent color space 61, thereby determining all of the entries for reverse model look-up table 36.

In the preferred embodiment, device dependent color space 60 and device independent color space 61 are three-dimensional. For example, device dependent color space 60 is a CMY color space, and device independent color space 61 is a CIELAB or a CIEXYZ color space. In this case, the foregoing determination of a reverse model proceeds exactly as above, except that each cell is defined by eight grid points in device dependent color space 60, and interpolation preferably is tetrahedral interpolation.

The device dependent color space can be expanded to four dimensions by performing black generation and/or undercolor removal on the CMY colors so as to obtain a black (K) color value. In such a case, the binary search is still performed in CMY color space, before the black generation and/or undercolor removal.

Figure 6A:
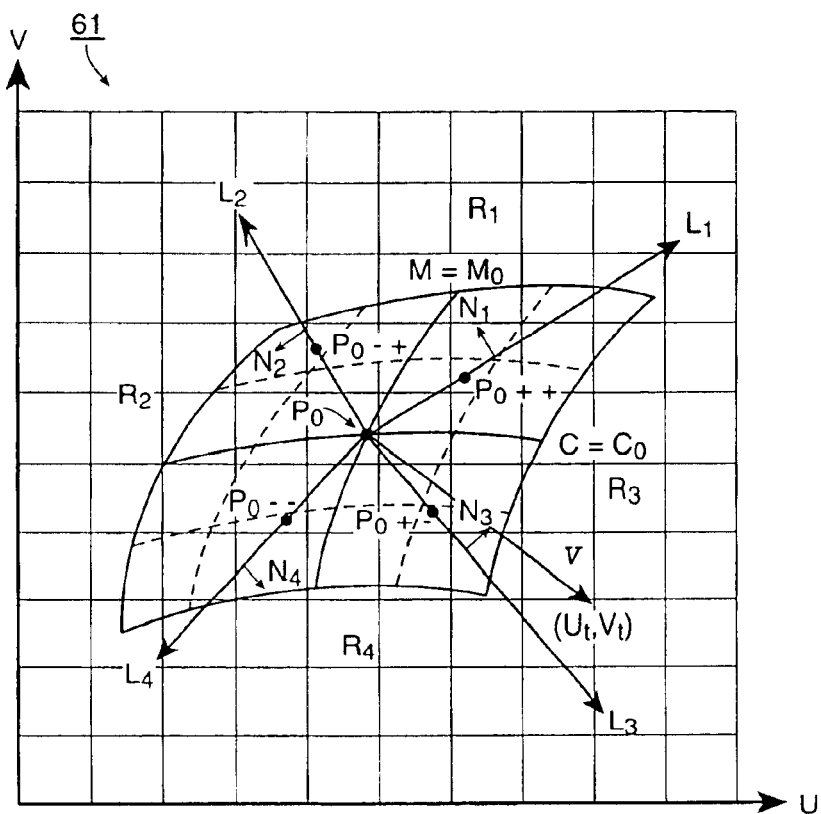
FIGS. 6A and 6B are representational views for explaining a binary search of a forward model look-up table according to the invention.
Figure 6B:
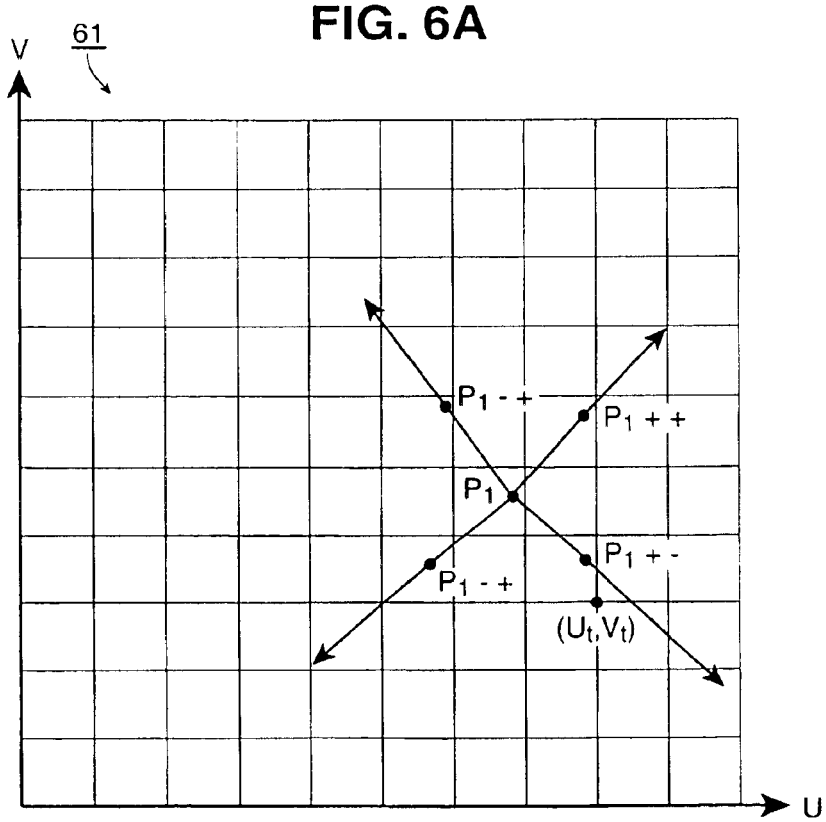

FIGS. 6A and 6B are representational views for explaining a binary search of forward model look-up table 35 according to the invention. Briefly, according to the invention, the binary search is performed through iterated steps starting from a starting color value in device dependent color space. First, the device independent color space is divided into multiple regions defined by device independent colors corresponding to small variations from the starting color in device dependent color space. Second, the region that contains the device independent target color is identified. Third, the starting color value in device dependent color space is updated based on which region contains the device independent target color. These steps are iterated until the iterated value of the starting color value converges into a single cell.

Shown in FIG. 6A is device independent color space 61, which includes point $P_0$ that corresponds to grid point $(C_0, M_0)$ in device dependent color space 60, and thus is an entry in forward model look-up table 35. Grid point $(C_0, M_0)$ is a guess for a starting color value for a device dependent color used in the binary search. As explained below, the initial value for the starting color value can be the midpoint of device dependent color space.

The points $P_0--$, $P_0+-$, $P_0-+$ and $P_0++$ are points in device independent color space 61 that correspond to grid points removed from grid point $(C_0, M_0)$ by a small distance $\Delta$ in device dependent color space 60. In the preferred embodiment, $\Delta$ corresponds to the distance between grid points in device dependent color space 60. In particular, these points are determined by applying forward model look-up table 35 to the following grid points in device dependent color space 60:

$(C_0+\Delta, M_0+\Delta)$ for $P_0++$,
$(C_0-\Delta, M_0+\Delta)$ for $P_0-+$,
$(C_0+\Delta, M_0-\Delta)$ for $P_0+-$, and
$(C_0-\Delta, M_0-\Delta)$ for $P_0--$.

Also shown in FIG. 6A is target color $(U_t, V_t)$ in device independent color space 61, and vector V from $P_0$ to target color $(U_t, V_t)$. The object is to derive C and M values that correspond to target color $(U_t, V_t)$, and to store those values in the reverse model look-up table at grid point $(U_t, V_t)$ As previously explained, the C and M values are derived by a binary search of the forward model look-up table (which is the present topic of explanation) to determine the cell in which the target color lies, followed by interpolation of the grid points that define the cell.

Lines $L_1$, $L_2$, $L_3$ and $L_4$ in FIG. 6A connect $P_0$ with each of $P_0++$, $P_0-+$, $P_0+-$ and $P_0--$. In particular, line $L_1$ connects points $P_0$ and $P_0++$; line $L_2$ connects points $P_0$ and $P_0-+$; line $L_3$ connects points $P_0$ and $P_0+-$; and line $L_4$ connects points $P_0$ and $P_0--$. Each of these lines has a normal vector N associated therewith. $N_1$ is associated with line $L_1$, $N_2$ with $L_2$, $N_3$ with $L_3$, and $N_4$ with $L_4$.

As shown in FIG. 6A, lines $L_1$, $L_2$, $L_3$ and $L_4$ divide device independent color space 61 into four regions $R_1$, $R_2$, $R_3$ and $R_4$. The device independent target color $(U_t, V_t)$ and vector V lie within one of these four regions. The identity of the region in which the target color lies provides information about the device dependent color that maps to the target color. In particular, each of these regions in device independent color space 61 is characterized by a condition for device dependent colors that map to that region. These conditions are as follows:

Colors that map to region $R_1$ have $C \geq C_0$.
Colors that map to region $R_2$ have $M \leq M_0$.
Colors that map to region $R_3$ have $M \geq M_0$.
Colors that map to region $R_4$ have $C \leq C_0$.

FIG. 6B shows point $P_1$ which corresponds to a different grid point in device dependent color space 60, namely $(C_1, M_1)$. $P_1$ is determined from $(C_1, M_1)$ by using forward model look-up table 35. Arrayed about point $P_1$ are points $P_1++$, $P_1-+$, $P_1+-$ and $P_1--$. These points also are determined using forward model look-up table 35, from grid points in device dependent color space 60 arrayed about point $P_1$ in a similar fashion as the points arrayed about point $P_0$ in FIG. 6A.

Figure 7:
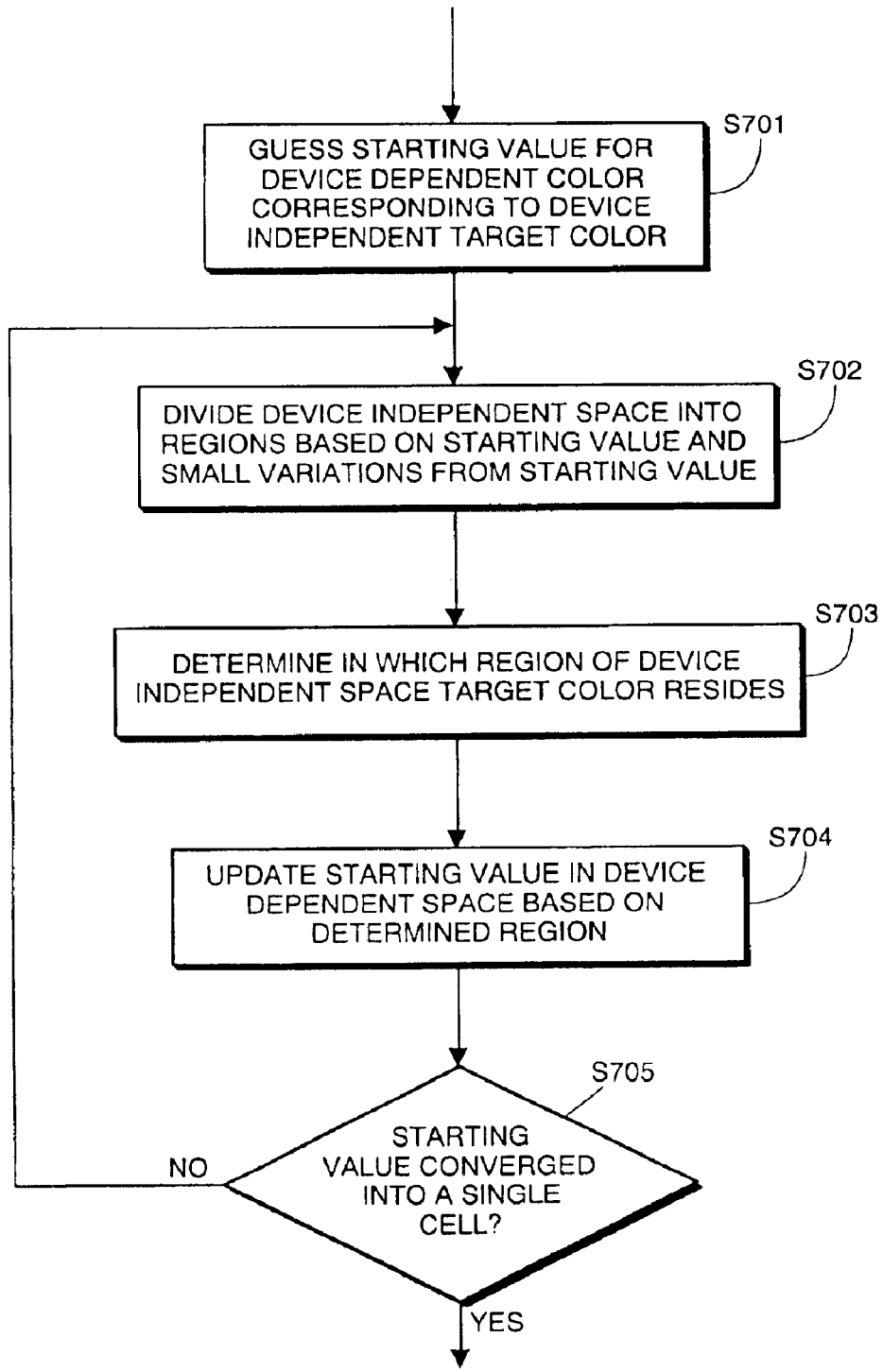
FIG. 7 is a flowchart for explaining a binary search of a forward model look-up table according to the invention.

FIG. 7 is a flowchart for explaining how the foregoing points, lines and regions of device independent color space 61 are used to perform a binary search according to the invention. In step S701, a guess is made as to a starting value for a device dependent color corresponding to the device independent target color with color values $(U_t, V_t)$. Assuming that the color values in device dependent color space 60 range from 0 to 1, the initial guess is selected as $(C_0, M_0)=(0.5, 0.5)$. The upper and lower bounds of the portion of the device dependent color space under consideration are also determined. In this case, the bounds are initially $0 \leq C \leq 1$ and $0 \leq M \leq 1$.

In step S702, device independent color space 61 is divided into regions based on the starting color value and small variations from the starting color value. In particular, points $P_0++$, $P_0-+$, $P_0+-$ and $P_0--$ in device independent color space 61 are determined as described above with reference to FIG. 6A. Then, lines $L_1$, $L_2$, $L_3$ and $L_4$ are determined from these points, and device independent color space 61 is divided into regions $R_1$, $R_2$, $R_3$, and $R_4$ using these lines.

Next, in step S703, the region of device independent color space 61 in which the target color $(U_t, V_t)$ resides is determined. This determination preferably is made by taking the dot product of vector V with the normal vectors $N_1$, $N_2$, $N_3$ and $N_4$ corresponding to lines $L_1$, $L_2$, $L_3$ and $L_4$, respectively. A positive dot product indicates that vector V is on the same side of a line as the normal vector for that line, and a negative dot product indicates that vector V is on the opposite side of the line. Thus, depending on the signs of the dot products, the region in which vector V lies can be determined.

For example, if the normal vectors are determined using the conventional right-hand rule, then the normal vectors extend in the directions of vectors $N_1$, $N_2$, $N_3$ and $N_4$ shown in FIG. 6A. In this case, the following rules can be used to determine the region in which vector V lies:

If $N_1 \cdot V$ is positive and $N_2 \cdot V$ is negative, then V lies in region $R_1$.

If $N_2 \cdot V$ is positive and $N_4 \cdot V$ is negative, then V lies in region $R_2$.

If $N_3 \cdot V$ is positive and $N_1 \cdot V$ is negative, then V lies in region $R_3$.

If $N_4 \cdot V$ is positive and $N_3 \cdot V$ is negative, then V lies in region $R_4$.

In the example shown in FIG. 6A, V lies in region $R_3$. Because V lies in region $R_3$, it is known that the M value in device dependent color space 60 corresponding to $(U_t, V_t)$ is greater than or equal to $M_0$. Accordingly, in step S704, the starting value for the color in device dependent color space 60 is updated to lie between the current starting value and the upper bound for M color values under consideration. In addition, the lower bound for M color values under consideration is updated to be equal to $M_0$. For example, using the numerical example above wherein $C_0=0.5$ and $M_0=0.5$, the updated starting value for M is 0.75, and the new bounds for M are $0.5 \leq M \leq 1$.

In a similar fashion, if it is determined that vector V resided in region $R_2$, then it is known that the M for point ($U_t$, $V_t$) is less than $M_0$. Accordingly, the starting value for M is updated to lie midway between the lower bound for M and the current starting value for M, and the upper bound for M is updated to be equal to $M_0$. Likewise, if V resides in $R_1$ or $R_4$, the starting value for C and the bounds for C are updated accordingly.

In step S705, it is determined if the updated starting value for a device dependent color corresponding to ($U_t$, $V_t$) has converged into a single cell in device dependent color space corresponding to ($U_t$, $V_t$). In particular, it is determined if the cell which contains the updated starting value is the same as the cell which contains the previous starting value. Alternatively, the updated starting value can be mapped to a point in the device independent color space using the forward model. Then, it can be determined if the mapped point is sufficiently close (i.e., within a predetermined limit) to ($U_t$, $V_t$) for the given circumstances.

In the example illustrated in FIG. 6B, the starting value has been updated to ($C_1$, $M_1$), which maps to point $P_1$ in independent color space 61. If ($C_1$, $M_1$) does not lie in the same cell as ($C_0$, $M_0$) in device dependent color space 60, or alternatively if $P_1$ is not sufficiently close to target color ($U_t$, $V_t$), then flow returns to step S702 and device independent color space 61 is again divided. The division of device independent color space 61 about point $P_1$ is illustrated in FIG. 6B. The region containing the vector from $P_1$ to ($U_t$, $V_t$) is determined, and the starting value and bounds for C and M are again updated. The updated values are checked to see if the new starting value is close enough to the target color, in which case the new starting value is provided as the result of the binary search. Otherwise, the steps are repeated.

In the case that device dependent color space 60 and device independent color space 61 are three-dimensional, the device independent color space is divided into six regions using twelve planes. Each plane is defined by two lines, and each line is defined by a point mapped from a starting value in device dependent color space, such as $P_x$ mapped from ($C_x$, $M_x$, $Y_x$), to points mapped from points close to the starting value. For $P_x$ mapped from ($C_x$, $M_x$, $Y_x$), the points used to define the lines are as follows:

($C_x+\Delta$, $M_x+\Delta$, $Y_x+\Delta$) for $P_x$+++,
($C_x+\Delta$, $M_x+\Delta$, $Y_x-\Delta$) for $P_x$++−,
($C_x+\Delta$, $M_x-\Delta$, $Y_x+\Delta$) for $P_x$+−+,
($C_x+\Delta$, $M_x-\Delta$, $Y_x-\Delta$) for $P_x$+−−,
($C_x-\Delta$, $M_x+\Delta$, $Y_x+\Delta$) for $P_x$−++,
($C_x-\Delta$, $M_x+\Delta$, $Y_x-\Delta$) for $P_x$−+−,
($C_x-\Delta$, $M_x-\Delta$, $Y_x+\Delta$) for $P_x$−−+, and
($C_x-\Delta$, $M_x-\Delta$, $Y_x-\Delta$) for $P_x$−−−, Each of the twelve planes is defined using two lines between point $P_x$ and two of the these points, as follows:

PL1 is defined using $P_x$−−− and $P_x$−−+.
PL2 is defined using $P_x$−−− and $P_x$−+−.
PL3 is defined using $P_x$−−− and $P_x$+−−.
PL4 is defined using $P_x$−−+ and $P_x$−++.
PL5 is defined using $P_x$−−+ and $P_x$+−+.
PL6 is defined using $P_x$−+− and $P_x$−++.
PL7 is defined using $P_x$−+− and $P_x$++−.
PL8 is defined using $P_x$+−− and $P_x$+−+.
PL9 is defined using $P_x$+−− and $P_x$++−.
PL10 is defined using $P_x$++− and $P_x$+++.
PL11 is defined using $P_x$+−+ and $P_x$+++.
PL12 is defined using $P_x$−++ and $P_x$+++.

The normal plane vectors for each of the planes is defined in accordance with conventional mathematical practices. In particular, the cross product of the two lines defining each plane results in the normal plane vector for that plane.

Using these twelve planes, the six regions that divide the device independent color space about $P_x$ are defined as follows:

R1 is bounded by PL8, PL9, PL10 and PL11.
R2 is bounded by PL1, PL2, PL4 and PL6.
R3 is bounded by PL6, PL7, PL10 and PL12.
R4 is bounded by PL1, PL3, PL5 and PL8.
R5 is bounded by PL4, PL5, PL11 and PL12.
R6 is bounded by PL2, PL3, PL7 and PL9.

The conditions for colors in device dependent color space that map to each of these regions in device independent color space are as follows:

Colors that map to region R1 have $C \geq C_x$.
Colors that map to region R2 have $C \leq C_x$.
Colors that map to region R3 have $M \geq M_x$.
Colors that map to region R4 have $M \leq M_x$.
Colors that map to region R5 have $Y \geq Y_x$.
Colors that map to region R6 have $Y \leq Y_x$.

Using the foregoing region and normal plane vector definitions and conditions, the binary search in three dimensions proceeds in the same manner as in the two dimensional case.

It should be noted that while the present invention is described herein with respect to deriving a reverse model look-up table for transforming colors in a device independent color space to a device dependent color space for a printer, the invention is equally applicable to other transformations. In particular, the invention is applicable in any situation wherein a model (possibly based on a set of empirical measurements) exists for a forward model transformation from a first color space to a second color space, and a look up table for a reverse model that is the inverse of the forward model transformation is needed.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A method for deriving a reverse model look-up table whose entries represent device dependent colors as a function of device independent colors, based on a forward model look-up table whose entries represent device independent colors obtained in response to printout of corresponding device dependent color components, wherein the forward model and the reverse model look-up tables both comprise a grid of cells in their respective color spaces with entries at each grid point of the grid, the method comprising the following steps to determine an entry in the reverse model look-up table for a device independent target color:

performing a binary search of the forward model look-up table to locate a cell that contains the device independent target color, wherein performing a binary search comprises steps of:
dividing the device independent color space into multiple regions defined by device independent colors with reference to a starting color in device dependent color space;
determining which of the multiple regions contains the device independent target color;
updating the starting color value based on which region contains the device independent target color; and
iterating the dividing, determining and updating steps until a cell containing the updated starting color and a cell containing a previous starting color are the same;

interpolating entries from the forward model look-up table at grid points that define the cell located by the binary search of the forward model look-up table, so as to obtain device dependent colors corresponding to the device independent target color; and storing the device dependent color at the grid point of the reverse model look-up table for the device independent target color.

2. A method according to claim 1, wherein said interpolating step comprises tetrahedral interpolation.

3. A method according to claim 1, wherein the device independent color space is CIEXYZ or CIELAB color space, and wherein the device dependent color space is CMY or CMYK color space.

4. A method according to claim 1, wherein the forward model look-up table is derived by printing color patches corresponding to predefined colors in device dependent color space, and measuring the colors of the patches in device independent color space.

5. A method according to claim 4, wherein the predefined colors are in CMY or CMYK space, and the colors are measured in CIEXYZ or CIELAB space.

6. A method according to claim 1, wherein interpolating entries from the forward model look-up table interpolates device-dependent colors to obtain a device-dependent color corresponding to the device-independent target color.

7. An apparatus for deriving a reverse model look-up table whose entries represent device dependent colors as a function of device independent colors, based on a forward model look-up table whose entries represent device independent colors obtained in response to printout of corresponding device dependent color components, wherein the forward model and the reverse model look-up tables both comprise a grid of cells in their respective color spaces with entries at each grid point of the grid, the apparatus comprising the following means to determine an entry in the reverse model look-up table for a device independent target color:

search performing means for performing a binary search of the forward model look-up table to locate a cell that contains the device independent target color, wherein the search performing means comprises:

dividing means for dividing the device independent color space into multiple regions defined by device independent colors corresponding to small variations from the starting color in device dependent color space;

determining means for determining which of the multiple regions contains the device independent target color;

updating means for updating the starting color value based on which region contains the device independent target color; and iterating means for iterating the dividing, determining and updating means until a cell containing the updated starting color and a cell containing a previous starting color are the same;

interpolating means for interpolating entries from the forward model look-up table at grid points that define the cell located by the binary search of the forward model look-up table, so as to obtain device dependent colors corresponding to the device independent target color; and storing means for storing the device dependent color at the grid point of the reverse model look-up table for the device independent target color.

8. An apparatus according to claim 7, wherein said interpolating means comprises means for performing tetrahedral interpolation.

9. An apparatus according to claim 7, wherein the device independent color space is CIEXYZ or CIELAB color space, and wherein the device dependent color space is CMY or CMYK color space.

10. An apparatus according to claim 7, wherein the forward model look-up table is derived by printing color patches corresponding to predefined colors in device dependent color space, and measuring the colors of the patches in device independent color space.

11. An apparatus according to claim 10, wherein the predefined colors are in CMY or CMYK space, and the colors are measured in CIEXYZ or CIELAB space.

12. An apparatus according to claim 7, wherein the interpolating means for interpolating entries from the forward model look-up table interpolates device-dependent colors to obtain a device-dependent color corresponding to the device-independent target color.

13. Computer-executable process steps stored on a computer-readable medium, the computer executable process steps to derive a reverse model look-up table whose entries represent device dependent colors as a function of device independent colors, based on a forward model look-up table whose entries represent device independent colors obtained in response to printout of corresponding device dependent color components, wherein the forward model and the reverse model look-up tables both comprise a grid of cells in their respective color spaces with entries at each grid point of the grid, the computer-executable process steps comprising the following codes to determine an entry in the reverse model look-up table for a device independent target color:

code to perform a binary search of the forward model look-up table to locate a cell that contains the device independent target color, wherein said code to perform a binary search comprises:

code to divide the device independent color space into multiple regions defined by device independent colors corresponding to small variations from the starting color in device dependent color space;

code to determine which of the multiple regions contains the device independent target color; and code to update the starting color value based on which region contains the device independent target color; and code to iterate the code to divide, determine and update steps until a cell containing the updated starting color and a cell containing a previous starting color are the same;

code to interpolate entries from the forward model look-up table at grid points that define the cell located by the binary search of the forward model look-up table, so as to obtain device dependent colors corresponding to the device independent target color; and code to store the device dependent color at the grid point of the reverse model look-up table for the device independent target color.

14. Computer-executable process steps according to claim 13, wherein said code to interpolate comprises code to perform tetrahedral interpolation.

15. Computer-executable process steps according to claim 13, wherein the device independent color space is CIEXYZ or CIELAB color space, and wherein the device dependent color space is CMY or CMYK color space.

16. Computer-executable process steps according to claim 13, wherein the forward model look-up table is derived by codes to print color patches corresponding to predefined colors in device dependent color space, and to measure the colors of the patches in device independent color space.

17. Computer-executable process steps according to claim 16, wherein the predefined colors are in CMY or CMYK space, and the colors are measured in CIEXYZ or CIELAB space.

18. Computer-executable process steps according to claim 13, wherein the code to interpolate entries from the forward model look-up table interpolates device-dependent colors to obtain a device-dependent color corresponding to the device-independent target color.

19. A computer-readable medium which stores computer-executable process steps, the computer-executable process steps to derive a reverse model look-up table whose entries represent device dependent colors as a function of device independent colors, based on a forward model look-up table whose entries represent device independent colors obtained in response to printout of corresponding device dependent color components, wherein the forward model and the reverse model look-up tables both comprise a grid of cells in their respective color spaces with entries at each grid point of the grid, the computer-executable process steps comprising the following steps to determine an entry in the reverse model look-up table for a device independent target color:

a search performing step to perform a binary search of the forward model look-up table to locate a cell that contains the device independent target color, wherein the search performing step comprises:

a dividing step to divide the device independent color space into multiple regions defined by device independent colors corresponding to small variations from the starting color in device dependent color space;

a determining step to determine which of the multiple regions contains the device independent target color; and an updating step to update the starting color value based on which region contains the device independent target color code to iterate the code to divide, determine and update steps until a cell containing the updated starting color and a cell containing a previous starting color are the same;

an interpolating step to interpolate entries from the forward model look-up table at grid points that define the cell located by the binary search of the forward model look-up table, so as to obtain device dependent colors corresponding to the device independent target color; and a storing step to store the device dependent color at the grid point of the reverse model look-up table for the device independent target color.

20. A computer-readable medium according to claim 19, wherein said interpolating step comprises tetrahedral interpolation.

21. A computer-readable medium according to claim 19, wherein the device independent color space is CIEXYZ or CIELAB color space, and wherein the device dependent color space is CMY or CMYK color space.

22. A computer-readable medium according to claim 19, wherein the forward model look-up table is derived by steps to print color patches corresponding to predefined colors in device dependent color space, and to measure the colors of the patches in device independent color space.

23. A computer-readable medium according to claim 22, wherein the predefined colors are in CMY or CMYK space, and the colors are measured in CIEXYZ or CIELAB space.

24. A computer-readable medium according to claim 19, wherein the interpolating step to interpolate entries from the forward model look up interpolates device-dependent colors to obtain a device-dependent color corresponding to the device-independent target color.

25. An apparatus for deriving a reverse model look-up table whose entries represent device dependent colors as a function of device independent colors, based on a forward model look-up table whose entries represent device independent colors obtained in response to printout of corresponding device dependent color components, wherein the forward model and the reverse model look-up tables both comprise a grid of cells in their respective color spaces with entries at each grid point of the grid, the apparatus comprising:

a memory including a region for storing the forward model look-up table, a region for storing the reverse model look-up table, and a region for storing executable process steps; and a processor for executing the executable process steps;

wherein the executable process steps include the following steps to determine an entry in the reverse model look-up table for a device independent target color: (a) performing a binary search of the forward model look-up table to locate a cell that contains the device independent target color, (b) interpolating entries from the forward model look-up table at grid points that define the cell located by the binary search of the forward model look-up table, so as to obtain device dependent colors corresponding to the device independent target color, and (c) storing the device dependent color at the grid point of the reverse model look-up table for the device independent target color;

wherein said step of performing a binary search comprises:

dividing the device independent color space into multiple regions defined by device independent colors with reference to a starting color in device dependent color space;

determining which of the multiple regions contains the device independent target color;

updating the starting color value based on which region contains the device independent target color; and iterating the dividing, determining and updating steps until a cell containing the updated starting color and a cell containing a previous start point are the same.

26. An apparatus according to claim 25, wherein the executable process step of interpolating entries from the forward model look-up interpolates device-dependent colors to obtain a device-dependent color corresponding to the device-independent target color.

* * * * *

UNITED STATES PATENT AND TRADEMARK OFFICE
CERTIFICATE OF CORRECTION

PATENT NO. : 6,870,636 B2
DATED : March 22, 2005
INVENTOR(S) : Manish Kulkarni

It is certified that error appears in the above-identified patent and that said Letters Patent is hereby corrected as shown below:

Column 6,
Line 5, "C+$C_0$ and M+$M_0$" should read -- C=$C_0$ and M=$M_0$ --.

Column 7,
Line 27, "$P_0$—, $P_0$+—, $P_0$—+ and $P_0$++" should read -- $P_0$--, $P_0$+-, $P_0$-+ and $P_0$+ + --;
Line 35, "$P_0$++," should read -- $P_0$+ +, --;
Line 36, "$P_0$—+," should read -- $P_0$-+, --;
Line 37, "$P_0$+—," should read -- $P_0$+-, --;
Line 38, "$P_0$—." should read -- $P_0$-- --;
Line 50, "$P_0$++, $P_0$—+, $P_0$+— and $P_0$—." should read -- $P_0$+ +, $P_0$-+, $P_0$+- and $P_0$--. --; and
Line 53, "$P_0$—." should read -- $P_0$--. --.

Column 8,
Line 6, "$P_1$++," should read -- $P_1$+ +, --;
Line 7, "$P_1$ —+, $P_1$+— and $P_1$ —." should read -- $P_1$-+, $P_1$+- and $P_1$--. --; and
Line 26, "$P_0$++, $P_0$—+, $P_0$+— and $P_0$—" should read -- $P_0$ + +, $P_0$-+, $P_0$+- and $P_0$-- --.

Column 9,
Line 39, "$P_x$+++," should read -- $P_x$+ + +, --;
Line 40, "$P_x$++—," should read -- $P_x$+ +-, --;
Line 41, "$P_x$+—+," should read -- $P_x$+-+, --;
Line 42, "$P_x$+—," should read -- $P_x$+--, --;
Line 43, "$P_x$ —++," should read -- $P_x$-+ +, --;
Line 44, "$P_x$ —+—," should read -- $P_x$- +-, --;
Line 45, "$P_x$ —+," should read -- $P_x$--+, --;
Line 46, "$P_x$—." should read -- $P_x$---. --;
Line 50, "$P_x$ — and $P_x$—+." should read -- $P_x$--- and $P_x$--+. --;
Line 51, "$P_x$ — and $P_x$ —+—." should read -- $P_x$--- and $P_x$-+-. --;
Line 52, "$P_x$ — and $P_x$+—." should read -- $P_x$--- and $P_x$+--. --;
Line 53, "$P_x$ —+ and $P_x$ —++." should read -- $P_x$--+ and $P_x$-++. --;
Line 55, "$P_x$ —+ and $P_x$+—+." should read -- $P_x$--+ and $P_x$+-+. --;
Line 56, "$P_x$ —+— and $P_x$—++." should read -- $P_x$--+- and $P_x$ -+ +. --;
Line 57, "$P_x$ —+— and $P_x$++—." should read -- $P_x$-+- and $P_x$+ +-. --;
Line 58, "$P_x$+— and $P_x$+—+." should read -- $P_x$+-- and $P_x$+-+. --;
Line 59, "$P_x$+— and $P_x$++—." should read -- $P_x$+-- and $P_x$+ +-. --;
Line 60, "$P_x$++— and $P_x$+++." should read -- $P_x$++- and $P_x$+ + +. --;
Line 61, "$P_x$+—+ and $P_x$+++." should read -- $P_x$+-+ and $P_x$+ + +. --; and
Line 62, "$P_x$ —++ and $P_x$+++." should read -- $P_x$-+ + and $P_x$+ + +. --.

UNITED STATES PATENT AND TRADEMARK OFFICE
CERTIFICATE OF CORRECTION

PATENT NO. : 6,870,636 B2
DATED : March 22, 2005
INVENTOR(S) : Manish Kulkarni

It is certified that error appears in the above-identified patent and that said Letters Patent is hereby corrected as shown below:

Column 14,
Line 6, "look up" should read -- look-up table --;
Line 22, "and" should be deleted;
Line 23, "steps;" should read -- steps, --;
Line 36, "color;" should read -- color, --; and
Line 53, "look-up" should read -- look-up table --.

Signed and Sealed this

Twenty-fifth Day of October, 2005

JON W. DUDAS
*Director of the United States Patent and Trademark Office*